July 28, 1970 W. E. GLENN, JR 3,522,046
THREE-DIMENSIONAL COLOR PICTURES AND METHOD OF MAKING
Filed April 18, 1967 3 Sheets-Sheet 1
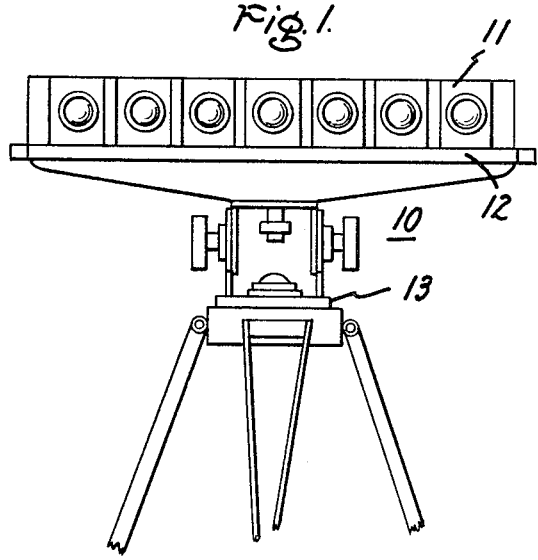
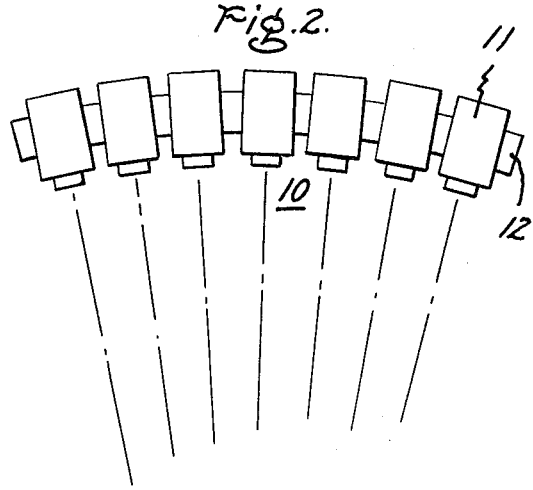
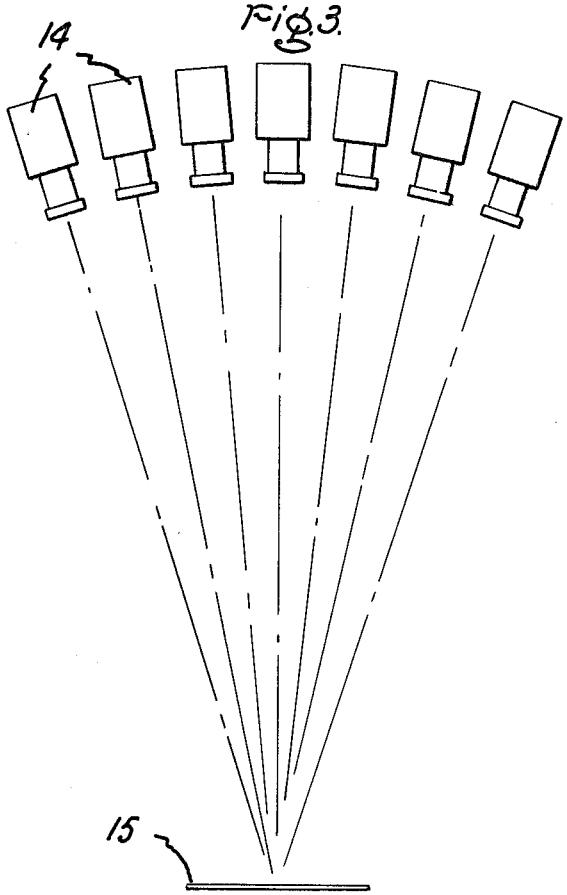
Inventor:
William E. Glenn Jr.,
by Richard R. Brainard
His Attorney.

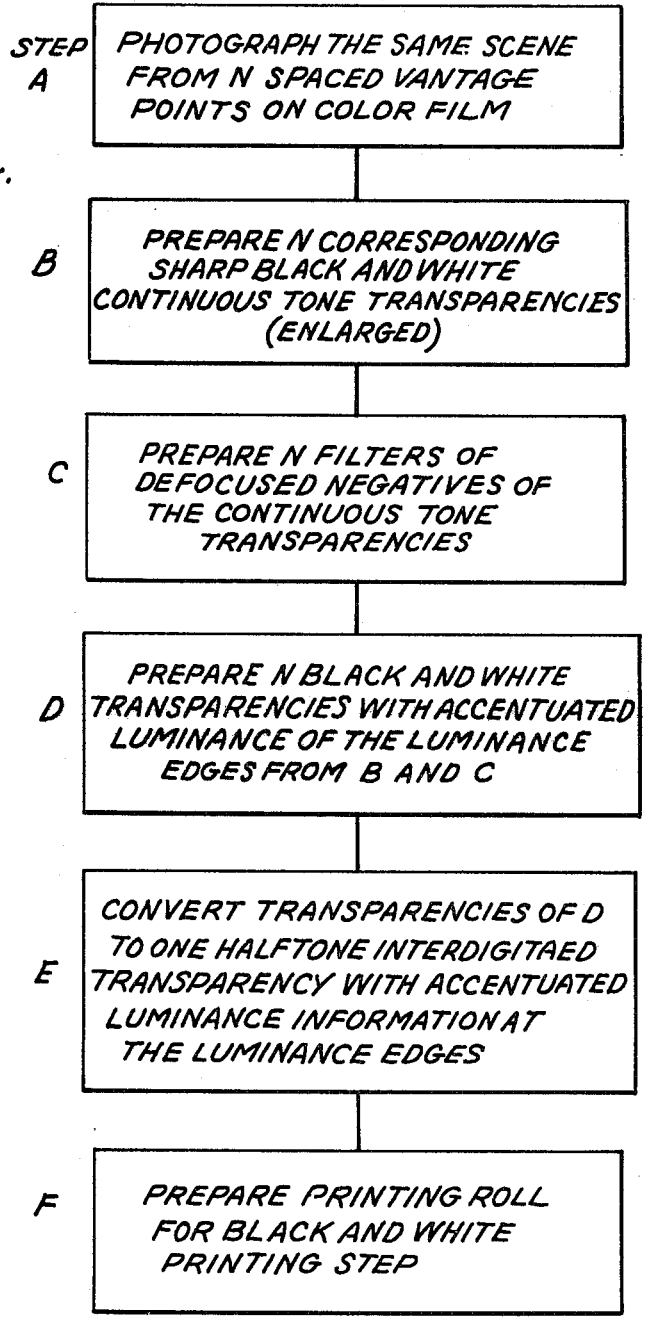

Fig. 5.

COLOR

STEP G: PREPARE ONE DEFOCUSED COLOR TRANSPARENCY (POSITIVE) FROM THE NEGATIVES OF STEP A

H: PREPARE THREE COLOR CORRECTED COLOR SEPARATION TRANSPARENCIES FROM G (BLACK AND WHITE NEGATIVES)

I: PREPARE ONE FILTER FROM N TRANSPARENCIES OF STEP D

J: PREPARE THREE COLOR SEPARATION TRANSPARENCIES WITH ATTENUATED LUMINANCE INFORMATION AT THE LUMINANCE EDGES FROM TRANSPARENCIES OF STEP H AND FILTER OF STEP I

K: PREPARE THREE COLOR PRINTING ROLLS FROM TRANSPARENCIES OF STEP J

Fig. 6.

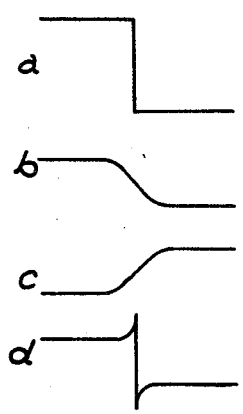

Inventor:
William E. Glenn Jr.,
by Richard R. Brainard
His Attorney.

United States Patent Office 3,522,046
Patented July 28, 1970

3,522,046
THREE-DIMENSIONAL COLOR PICTURES AND METHOD OF MAKING
William E. Glenn, Jr., Scotia, N.Y., assignor to General Electric Company, a corporation of New York
Continuation-in-part of application Ser. No. 495,276, Oct. 12, 1965. This application Apr. 18, 1967, Ser. No. 631,803
Int. Cl. G03c 9/00
U.S. Cl. 96—40    5 Claims

ABSTRACT OF THE DISCLOSURE

Three dimensional color pictures are produced by a multi-color printing process in which the three-dimensional information and picture detail are produced in the black and white printing step and essentially defocused color information is printed in the color printing steps, corresponding respectively to the three primary colors. Transparencies for use in the production of the printing rolls are prepared accordingly and, in addition, the transparency for making the printing roll for the black and white, or luminance, information is made with accentuated luminance at the luminance edges by the use of filters produced from defocused color transparencies. In a similar manner, the transparencies from which the printing rollers for the color steps are produced are provided with attenuated luminance information at the luminance edges by the use of a suitable filter in their preparation. The result is a high quality three-dimensional picture, and the problem of registration between the different printing steps is minimized.

---

The present application is a continuation-in-part of my application Ser. No. 495,276, filed Oct. 12, 1965.

There is an increasing interest in making good quality three-dimensional color pictures, and some pictures of this type have recently appeared in national magazines. One method of taking three-dimensional pictures and reproducing them is described in an article by Leslie P. Dudley entitled "Autostereoscopic Lunar Photography," appearing in the October 1961 Journal of the Society of Motion Picture and Television Engineers 70, pages 799–803. As there described, particularly on page 800 under the heading "The Panoramic Parallax Stereogram," a black and white picture is taken by a number of cameras in closely spaced, side-by-side relation so that a number of images of the same scene are photographically recorded from a plurality of spaced vantage points, the number corresponding to the number of picture elements in each group of the lenticular picture to be produced. A set of picture elements is made up of interdigitated picture elements, one element from the image as recorded by each of the cameras, so that each set of picture elements appearing under one lenticule of the viewing lenticular screen represents an elemental portion of the total scene as viewed by each one of the cameras, and adjacent pairs of these picture elements in a single set form a stereoscopic pair. Whether or not the stereoscopic pairs of elements are adjacent or spaced by two or more picture elements depends upon the spacing of the cameras and distance to the scene as compared to the interocular distance and the viewing distance, i.e. the camera angles and viewing angles. As pointed out in my above mentioned application, Ser. No. 495,276, the apparent quality of the print as seen by the viewer is determined to a considerable degree by accuracy of registration of the lenticules of the screen with the sets of picture elements which they overlie.

In addition, the accuracy of the registration between the printing steps employed for printing the black and white, or luminance, information and color information also contributes substantially to the quality of the picture. When all the printing steps of a multi-step color printing process involve the three dimensional information, i.e. the interdigitated picture element structure, the problem of registration between the various printing steps is serious, and misregistration results in a substantial degradation of the picture quality. In accordance with an important aspect of the present invention, the luminance information and all three-dimensional information is printed in the black and white, or luminance, printing step, and, in addition, the luminance at the luminance edges is accentuated. The transparencies from which the color printing rolls are prepared are essentially defocused pictures in which the luminance at the luminance edges is deemphasized or attenuated. Since the eye of the observer is more sensitive to luminance than color, the resulting picture gives the impression of a clear sharp picture in detail, with pleasing color, which may be thought of almost as a color-tinted three dimensional black and white picture.

It is accordingly an important object of the present invention to provide an improved method of making transparencies for use in the preparation of printing rolls for the production of three-dimensional color pictures by a multi-step printing process.

It is another object of my invention to provide improved quality three-dimensional color pictures.

It is still a further object of my invention to minimize problems of registration between the various printing steps in a multi-step color printing process of producing three-dimensional color pictures.

Further objects and advantages will become more apparent as the following description proceeds, reference being had to the accompanying drawing, and its scope will be pointed out in the appended claims.

In the drawing:

FIG. 1 is an elevational view showing, in outline, a camera arrangement suitable for taking three-dimensional pictures;

FIG. 2 is a plan view, in outline, of the camera arrangement of FIG. 1;

FIG. 3 is a schematic representation of a projection and enlarging system suitable for composing and enlarging the images photographed and recorded by the camera of FIG. 1;

FIGS. 4 and 5 are flow charts showing the method steps employed in producing the transparencies in accordance with the present method; and FIG. 6 illustrates the manner in which luminance accentuation at the color edges is produced.

A suitable multiple camera arrangement for taking pictures to be reproduced in accordance with the present invention is shown in FIGS. 1 and 2 of the drawing. The camera assembly 10 is made up of a number of individual cameras shown in outline at 11, all mounted on a support 12 in the same horizontal plane and preferably on the arc of a circle, as shown in FIG. 2. The assembly is preferably mounted on an adjustable support such as a tripod 13. The cameras are compact and are particularly so in a horizontal direction so that several cameras occupy a horizontal distance which may be equal to the spacing between the eyes of an individual who is to view the image. For example, the center-to-center spacing of the cameras may be approximately one and one-half inches. The number of cameras which corresponds to the number of picture elements that will appear under each lenticule may be in the order of seven to ten, for example, seven having been illustrated in FIG. 1. In taking the picture, the color film in each camera is simply exposed so that there are seven pictures taken from the seven vantage points corresponding to the locations of the individual cameras. An improved camera of the above general type is described and claimed in my copending application Ser. No. 620,844, filed Mar. 6, 1967.

As described in detail and claimed in my copending application Ser. No. 671,772, filed concurrently herewith as a continuation-in-part of said application Ser. No. 495,276, filed Oct. 12, 1965, the apparatus of FIG. 3 provides for the carrying out of an improved method of enlarging and composing a three-dimensional picture in accordance with which the scenes taken from the individual vantage points may be projected on an image area of a screen and the apparent plane of the three-dimensional picture, or plane of sharp focus of the picture, determined by adjusting the position of the projectors until the objects in that plane produced from the different projectors are in exact registry. Objects in other planes will not appear in exact registry and will provide the three dimensional aspect of the picture. In addition to this, the picture may be viewed through a lenticular screen to see how the finished three-dimensional picture will look. At this stage, the light level of the individual projectors can be adjusted, and the color component contributed by each projector may be adjusted by suitable color filters when color prints are being made, all as described in more detail and claimed in the above mentioned concurrently filed application. After the picture has been composed as described above, the improved composite and color separation transparencies are prepared for use in making the printing rolls for the different printing steps.

A specific example of the method of making the transparencies in accordance with the present invention will now be described in connection with the charts of FIGS. 4 and 5. Assuming that step A of FIG. 4 has been completed by taking a picture of a given scene with each of the cameras on color film and that the picture has been composed as described above, individual enlarged continuous tone black and white transparencies corresponding to the scene as viewed from each of the camera locations are prepared simply by exposing a high quality black and white film in the position of the image area 15 of the FIG. 3 without any halftone or lenticular screen in the projection path. These enlarged transparencies, equal in number to the number of camera locations, correspond to step B of FIG. 4.

The next step is the preparation of filters for use with the above enlarged transparencies to produce the accentuated luminance information at the luminance boundaries. The filters have diminished or attenuated luminance at the color edges, and while it is possible to make a single filter by using a lower contrast film than used for the making of the continuous film transparencies, and making seven exposures—one with each of the continuous tone transparencies—it is preferable to prepare seven separate transparencies for the filters. In a preferred method, seven filters are prepared by making seven transparencies, using successive exposures through one or more of the enlarged continuous tone transparencies for each filter, these transparencies corresponding to the images recorded from vantage points other than the one with which the filter is to be used, e.g. a filter for the continuous tone transparency corresponding to the centrally located camera may be prepared by making successive exposures through two negatives, one corresponding to the scene as viewed from the cameras on either side of the central camera. This is the completion of step C, and at this point in the method we have seven continuous tone enlarged transparencies corresponding to the seven vantage points from which the scene has been photographed, and seven filters of low contrast ratio and which may be termed defocused transparencies. (These are negatives with respect to the continuous tone transparencies of step B.)

Seven continuous tone black and white transparencies are now made by exposing seven different areas of black and white film to light passing through one of the sharp continuous tone transparencies of step B and the corresponding defocussed lower contrast ratio filter of step C, to provide black and white transparencies with luminance information accentuated at the luminance edges (step D).

These seven transparencies may now be processed to produce the halftone interdigitated composite transparency containing all the three dimensional information with accentuated luminance at the color edges and from which the black and white printing plate or roller is prepared in accordance with techniques well known in the printing art. While the conversion of the continuous tone transparencies with the accentuated luminance at the luminance edges provided at the end of step D to the halftone interdigitated transparencies may be accomplished in a single step, it is preferably accomplished by first preparing the halftone and then the interdigitated halftone transparencies as described in detail in my copending application Ser. No. 631,770, filed concurrently herewith. In general, the seven halftone transparencies are made by exposing seven areas of black and white film to light transmitted through a halftone screen ruled in a direction orthogonal to the direction of the picture elements of the ultimate picture and one of the transparencies of step D. The composite transparency is then made by making exposures from seven different light sources through a light path including a lenticular lens sheet and the seven halftone transparencies in successive exposures.

The manner in which the luminance is accentuated at the luminance edges in the above process may be explained in connection with FIG. 6, in which 6a illustrates the change of luminance at a color edge. The intensity illustrated is that which would normally be used in black and white picture printing. A lower intensity is normally utilized in the black and white step of a four-color printing process. FIG. 6b illustrates the luminance information at a luminance edge from a defocused color scene. FIG. 6c illustrates the negative of the luminance information in FIG. 10b and FIG. 6d illustrates the sum of 6a and 6c, i.e. it represents the intensity normally used in black and white pictures minus the luminance information from a defocused negative at a luminance edge. It may be more accurate to look at FIG. 6d as representing the luminance information of 6a, i.e. an intensity normally used for making black and white printed pictures which is reduced in intensity except at the luminance edge.

The preparation of the transparencies utilized for making the printing rolls for the color printing steps will now be described by reference to FIG. 5. As the first step (step G), a continuous tone enlarged color transparency is prepared, using all seven projectors of FIG. 3 without a lenticular lens sheet to produce a single defocused color transparency. Next, assuming, for example, a three-color step process, three color separation negatives are produced on separate areas of black and white film corresponding respectively to the three colors. Each is made with a suitable color filter corresponding to the primary color and a color correction filter which is used, as is well understood in the art, to correct for the different sensitivity of the black and white film to different colors. This step corresponds to step H of FIG. 5.

These three color-corrected color separation transparencies are next converted to corresponding transparencies in which the intensity information at the luminance edges is diminished or attenuated. This is accomplished by reducing the contrast at the luminance edges by essentially the same amount as it was increased in making the transparencies for the preparation of the black and white printing rollers. A single filter for this purpose is produced by using the seven transparencies containing luminance information accentuated at the edges, as prepared in step D, and making successive exposures on suitable black and white film (step I). The resulting transparency is used as a filter with each of the color corrected transparencies produced at the end of step H of FIG. 5 to produce the finished color separation transparencies with attenuated luminance at the luminance edges (step J) and which are used in the preparation of the printing rolls for the color printing step in the manner well understood in the art. In the specific example, three color printing steps have been described. It will be apparent that the invention is equally applicable to color printing processes with more or less than three color printing steps. Also, mention has been made of printing rolls, and it will be understood that plates or rolls are both contemplated as the ultimate means of printing the pictures.

Since essentially the luminance information that is accentuated in the transparency for the black and white printing step is attenuated in the color separation transparency, the overall contrast of the picture is not disturbed, but the black and white picture which carries the three-dimensional information and the picture details is the dominant and controlling aspect of the total picture from the standpoint of the viewer. In effect, it creates somewhat the same visual impression as is created by tinting a black and white picture to get a colored picture. The overall result is a simplification of the preparation and printing of the picture, as well as an elimination of degradation of the picture quality which otherwise results from failure to maintain great accuracy in the registration of the color printing steps with the printing of the luminance information, i.e. the black and white printing step of the multi-color printing process.

What I claim as new and desire to secure by Letters Patent of the United States is:

1. The method of producing transparencies for use in the production of the printing rolls for a multi-step color printing process for printing three-dimensional color pictures of the type comprising a plurality of groups of interdigitated picture elements with the elements of each group each taken from a different vantage point and adapted to be viewed through an overlying lenticular lens registered therewith, which method comprises recording on color film a scene from each of a plurality of spaced vantage points, producing from said color film a black and white composite transparency for use in the production of the printing roll for the black and white printing step including the interdigitated elements to convey the three dimensional information and accentuated luminance information at the luminance edges, and producing color separation transparencies corresponding respectively to the color printing steps which do not contain three dimensional information and having luminance information attenuated at the luminance edges.

2. The method of claim 1 in which a continuous tone black and white transparency is prepared from the color film exposed at each location, a defocused negative of each continuous tone transparency is prepared and used with the corresponding continuous tone transparency to provide black and white transparencies with accentuated luminance at the luminance edges.

3. The method of claim 2 in which the black and white transparencies with accentuated luminance at the luminance edges are converted to a single interdigtated halftone print having luminance information accentuated at the luminance edges.

4. The method of claim 2 in which a single filter is prepared by making successive exposures of the continuous tone black and white transparencies, and this filter used with each of the color separation transparencies corresponding to the different color printing steps to prepare color separation transparencies with attenuated luminance information at the luminance edges.

5. A three-dimensional color picture of the type including a plurality of groups of picture elements, the elements of each group being taken from a different vantage point and each group adapted to underlie the lenticular lens element through which the picture element is to be viewed, said picture being the composite of a black and white printing step in which the interdigitated picture elements are printed with luminance information accentuated at the luminance edges, and a plurality of color printing steps, each corresponding to a different color, in which no interdigitated elements are printed and the luminance information is attenuated at the luminance edges.

References Cited
UNITED STATES PATENTS 2,854,335  9/1958  Mahler _____ 96—13
3,241,429  3/1966  Rice et al. _____ 88—1

DAVID KLEIN, Primary Examiner

U.S. Cl. X.R.
96—45